United States Patent
Kelm et al.

(10) Patent No.: US 10,223,394 B1
(45) Date of Patent: Mar. 5, 2019

(54) DATA RECONCILIATION

(71) Applicant: Amazon Technologies, Inc., Seattle, WA (US)

(72) Inventors: Raymond Henry Kelm, Issaquah, WA (US); Eric Lee Oliver, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1003 days.

(21) Appl. No.: 14/667,553

(22) Filed: Mar. 24, 2015

(51) Int. Cl.
*G06F 17/30* (2006.01)

(52) U.S. Cl.
CPC .. *G06F 17/30327* (2013.01); *G06F 17/30109* (2013.01); *G06F 17/30371* (2013.01)

(58) Field of Classification Search
None
See application file for complete search history.

(56) References Cited

U.S. PATENT DOCUMENTS

| | | | | |
|---|---|---|---|---|
| 7,925,624 B2* | 4/2011 | Vosshall | ............ | G06F 17/30575 707/610 |
| 9,361,302 B1* | 6/2016 | Mao | .................. | G06F 17/30076 |
| 9,705,730 B1* | 7/2017 | Petri | .................... | H04L 29/0854 |
| 2007/0282915 A1* | 12/2007 | Vosshall | ............ | G06F 17/30575 |
| 2008/0195583 A1* | 8/2008 | Hsu | .................... | G06F 17/30477 |
| 2010/0076930 A1* | 3/2010 | Vosshall | ............ | G06F 17/30575 707/638 |
| 2010/0309933 A1* | 12/2010 | Stark | .................. | G06F 17/30327 370/503 |
| 2011/0184920 A1* | 7/2011 | Vosshall | ............ | G06F 17/30575 707/690 |
| 2011/0225429 A1* | 9/2011 | Papamanthou | ......... | G06F 21/64 713/189 |

\* cited by examiner

*Primary Examiner* — Ashish Thomas
*Assistant Examiner* — Mellissa M. Ohba
(74) *Attorney, Agent, or Firm* — Lee & Hayes, P.C.

(57) ABSTRACT

With respect to reconciling data between a source system and one or more destination systems, a source agent obtains data from the source system. A destination agent obtains data from the destination system. The source and destination agents generate digests of the data obtained from the source and destination systems, respectively. The digests are provided to a consistency service for storage. The digests of the data stored at the source system are stored in a first tree data structure, such as a variant of a Merckle tree. The digests of the data stored at the destination system are stored in a second tree data structure, which might also be a variant of a Merckle tree. A comparison of the trees may be made in order to determine the consistency level of the data stored at the source system and the destination systems.

20 Claims, 13 Drawing Sheets

DATA RECONCILIATION

BACKGROUND

Data reconciliation is a process by which two data sources share information about the data records that they have, so that they can identify missing or changed data records. Typically, one data store (i.e. a source system) is considered authoritative and the other data store (i.e. a destination system) is considered a copy.

One simple process for checking that all of the data records from a source system are present at a destination system involves assigning all of the data records a unique identifier ("ID"). A join operation may then be performed on a table of data records from the source system and on a table of data records from the destination system. Any IDs that are missing a joined row following the join operation are considered missing records.

The asymptotic time for performing a join operation is typically computationally expensive. Assuming, for example, that a source system has $T_1$ data records and that a destination system has $T_2$ data records. Joining two tables containing these records together by brute force takes $T_1 * T_2$ time and $T_1 + T_2$ memory. If the IDs are comparable, then sorting the records from the source system (i.e. $T_1$ data records) and then sorting the data from the destination system (i.e. $T_2$ data records) yields $T_1 * \log(T_1) + T_2 * \log(T_2)$ time and still uses $T_1 + T_2$ memory. Moreover, after agreeing on data completeness, another operation may be performed to assess data integrity, which takes linear time.

At a very large scale, previous approaches to data completeness and data integrity, such as the simple process described above, may be suboptimal because both $T_1$ and $T_2$ can be in the order of tens or even possibly hundreds of billions of data records. It is with respect to these and other considerations that the disclosure made herein is presented.

DETAILED DESCRIPTION

Figure 1:
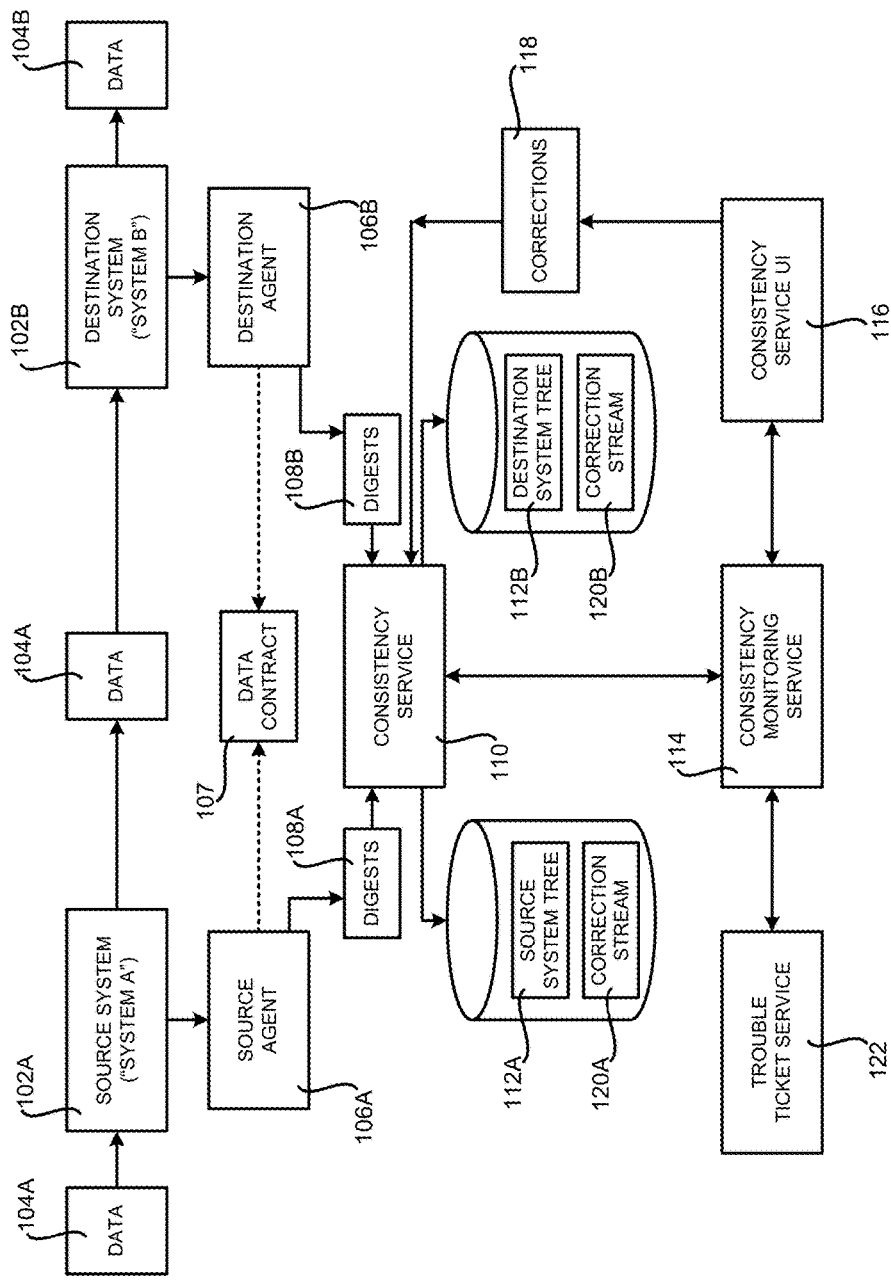
FIG. 1 is a system diagram showing aspects of the configuration and operation of several components disclosed herein for data reconciliation.

The following detailed description is directed to technologies for data reconciliation. Through an implementation of the technologies disclosed herein, data reconciliation may be performed in logarithmic time (e.g. $\log(T_1 + T_2)$). In order to accomplish this, a tree data structure, such as a variant of a Merckle tree, may be utilized to divide data records from different systems into meaningful, homomorphic chunks that can be processed in parallel via computing clusters in order to discover points where data is either missing or corrupted, and thus achieving data completeness and data integrity systematically. Because reconciliation may be performed piecewise in the various configurations disclosed herein, the reconciliation process can also be done asynchronously and in real or near real time to immediately describe where data records went missing or were corrupted.

According to one aspect disclosed herein, a source computing system is configured to store data and to replicate the data to at least one destination computing system for storage. The mechanisms disclosed herein provide functionality for reconciling the data stored at the source system with the replicated version of the data that is stored at the destination system. As discussed briefly above, data reconciliation generally refers to a process by which two data sources (i.e. the source computing system and the destination computing system) share information about the data records that they have, so that they can identify data records that have arrived out of order, that have been delayed, that never arrive, or that were corrupted while in transit or when stored. Typically, one data source (e.g. the source computing system) is considered authoritative and the other data source (e.g. the destination computing system) is considered a copy.

In order to reconcile the data stored at the source computing system with the data stored at the destination computing system, a source agent is configured in one implementation to collect data records from the source computing system. Similarly, a destination agent is configured to collect data records from the destination computing system. The source and destination agents might also be configured to confirm that the data obtained from the source and destination computing systems complies with a data contract. For example, and without limitation, the data contract might specify that the data stored at both the source and destination computing systems is at the same level of granularity, that the data stored at both systems has a common set of attributes, that there exists an attribute of a data record in the data of both systems that can be utilized to select data (which might be referred to herein as a "selection attribute"), and that there exists a means to identify the data records from both systems that have been previously included in the measurement. The data contract might specify other requirements in other configurations.

The source agent and the destination agent are also configured to generate digests of the data records obtained from the source and destination computing systems, respectively. The digests may be generated by computing a hash value of data records obtained from the source or destination system and then performing a Boolean or arithmetic operation on the hash values to generate a single hash value for the digest. For example, in one particular configuration, an exclusive OR ("XOR") operation is performed on the hash values of the records in data obtained from the source or destination computing systems. The resulting hash value might be included in the digest for the records. Other attributes obtained from the records might also be included in the digests in other configurations.

The digests may be stored in trees or other types of data structures associated with the source computing system and the destination computing system. For example, and without limitation, the digests are stored in variants of Merckle trees in one particular configuration. As known to those skilled in the art, Merckle trees are tree data structures wherein each non-leaf node stores a hash value for its children nodes. In a standard Merckle tree, however, the child nodes are strictly ordered and the hash of a parent node is a hash of the children nodes hashes in a specific order. The variant of the Merckle tree utilized in one configuration disclosed herein is identical to a Merckle tree, but the child nodes need not be strictly ordered because they might not all be available. Additionally, the hash value for each parent node in the variant utilized in one configuration disclosed herein utilizes the XOR operation described above rather than a hash of the children's hash values. Other variants of a Merckle tree, other types of tree data structures, and other types of non-tree data structures such as a flat list might also be utilized in other configurations.

As will be described in greater detail below, a comparison may be made between the tree of digests of the data stored at the source computing system and the tree of digests of the data stored at the destination computing system in order to determine the level of consistency between the data. As will also be described below, utilization of a variant of a Merckle tree permits an optimized comparison of the trees when determining the level of consistency between the data from the source computing system and the destination computing system.

In some configurations, a user interface ("UI"), such as a graphical user interface ("GUI") or a command line interface ("CLI"), are provided through which a user can provide corrections to the data obtained from the source computing system and the destination computing system. This data might also be utilized when determining the level of consistency between the data stored at the source computing system and the destination computing system.

In some configurations, various actions might also be taken based upon the determined level of consistency between the data stored at the source computing system and the data stored at the destination computing system. For example, and without limitation, rules might be defined that trigger different types of actions based on the level of consistency. As several specific examples, electronic mail or other types of messages might be sent and/or trouble tickets might be generated if the level of consistency falls below a specified threshold level. Other types of actions might also be performed based upon the computed level of consistency between the data stored at the source computing system and the data stored at the destination computing system. Additional details regarding the implementation and operation of the technologies disclosed herein for data reconciliation are provided below with regard to FIGS. 1-13.

It should be appreciated that the subject matter presented herein may be implemented as a computer process, an electronic computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, electronic-book readers, special-purposed hardware devices, network appliances, and the like. The various configurations described herein may also be practiced in service provider networks, where tasks are performed by remote processing devices that are linked through a communications network. In a service provider network, program modules may be located in both local and remote memory storage devices.

In the following detailed description, references are made to the accompanying drawings that form a part hereof, and that show, by way of illustration, specific configurations, aspects, or examples. The drawings herein are not drawn to scale. Like numerals represent like elements throughout the several figures.

FIG. 1 is a system diagram showing aspects of the configuration and operation of several components disclosed herein for data reconciliation in one particular implementation. In particular, and as illustrated in FIG. 1, a source computing system 102A (which might also be referred to herein as the "source system" or "system A") is configured to store data 104A and to replicate the data 104A to at least one destination computing system 102B (which might also be referred to herein as the "destination system" or "system B") for storage. The data 104A might be organized as a sequence of records having arbitrary attributes.

The mechanisms disclosed herein provide functionality for reconciling the data 104A stored at the source system 102A with the replicated version of the data 104B that should be stored at the destination system 102B. As discussed briefly above, data reconciliation generally refers to a process by which two data sources (i.e. the source computing system 102A and the destination computing system 102B) share information about the data records that they have, so that they can identify data records that have arrived out of order, that have been delayed, that never arrive, or that were corrupted while in transit or when stored. Typically, one data source (e.g. the source computing system 102A) is considered authoritative and the other data source (e.g. the destination computing system 102B) is considered a copy.

In order to reconcile the data 104A stored at the source computing system 102A with the data 104B stored at the destination computing system 102B, a source agent 106A is configured in one implementation to collect the data 104A from the source computing system 102A. Similarly, a destination agent 106B is configured to collect data 104B from the destination computing system 102B. The source agent 106A and the destination agent 106B might be software agents configured specifically for operation with the source system 102A and the destination system 102B. The source agent 106A and the destination agent 106B might also be implemented in hardware or in a combination of software and hardware.

As discussed briefly above, the source agent 106A and the destination agent 106B might also be configured to confirm that the data 104A and 104B obtained from the source computing system 102A and the destination computing system 102B complies with a data contract 107. For example, and without limitation, the data contract 107 might specify that the data 104 stored at both the source computing system 102A and the destination computing system 102B is at the same level of granularity, that the data 104 stored at both systems 102 has a common set of attributes, that there exists an attribute of a data record in the data 104 of both systems 102 that can be utilized to select data records (which might be referred to herein as a "selection attribute"), and that there exists a means to identify the data records from both systems 102A and 102B that have been previously included in the measurement. The data contract 107 might specify other requirements in other configurations.

The data contract 107 might be expressed using a human readable language such as the extensible markup language ("XML") or JavaScript Object Notation ("JSON"), and exchanged electronically between the source agent 106A and the destination agent 106B. The data contract 107 might also be expressed using other human readable and non-human readable languages and/or formats, and may be provided to the source agent 106A and the destination agent 106B using other mechanisms.

The source agent 106A and the destination agent 106B are also configured to generate digests 108 of the data 104 obtained from the source and destination computing systems, respectively. For example, the source agent 106A may generate digests 108A of the data 104A obtained from the source system 102A. Similarly, the destination agent 106B may generate digests 108B of the data 104B obtained from the destination system 102B.

It should be appreciated that while only a single source agent 106A and a single destination agent 106B are illustrated in FIG. 1, multiple such agents might be utilized in other configurations. For example, multiple source agents 106A and multiple destination agents 106B might be utilized, particularly where the source system 102A and/or the destination system 102B are partitioned. It should also be appreciated that the source agent 106A and the destination agent 106B might be implemented utilizing computing clusters in some implementations. For example, multiple instances of the source agent 106A and the destination agent 106B might be executed on separate clusters. Each instance might be configured to execute periodically, obtain the data 104 for a particular time period (e.g. one hour), create the appropriate digest 108, and provide the digest 108 to the consistency service 110. The consistency service 110 can then merge the digests 108 into the appropriate tree in the manner described below. Additional details regarding the operation of the source agent 106A and the destination agent 106B are provided below with regard to FIG. 3.

The digests 108 may be generated by computing a hash value of data records obtained from the source or destination systems, and then performing a Boolean or arithmetic operation on the hash values to generate a single hash value for the digest 108. For example, in one particular configuration, an XOR operation is performed on the hash values of the records in data 104 obtained from the source or destination computing systems. The resulting hash value might be included in the digest 108 for the records. Other attributes obtained from the records might also be included in the digests 108 in other configurations. Additional details regarding the creation of the digests 108 will be provided below with regard to FIG. 2.

As shown in FIG. 1, the source agent 106A and the destination agent 106B may periodically provide the digests 108A and 108B, respectively, to a consistency service 110 for storage in one particular configuration. As also shown in FIG. 1, the consistency service 110 might store the digests 108 in tree data structures ("trees") associated with the source computing system 102A and the destination computing system 102B. In particular, the digests 108A provided by the source agent 106A may be stored in a source system tree 112A. Similarly, the digests 108B provided by the destination agent 106B might be stored in a destination system tree 112B. An appropriate storage system might be utilized to store the source system tree 112A and the destination system tree 112B.

In one particular configuration, the source system tree 112A and the destination system tree 112B are implemented as variants of Merckle trees. As known to those skilled in the art, Merckle trees are tree data structures wherein each non-leaf node stores a hash value for its children nodes. As discussed above, the variant of a Merckle tree utilized in one configuration disclosed herein is identical to a Merckle tree, but the child nodes need not be strictly ordered because they might not all be available. Additionally, the hash value for each parent node in the variant utilized in one configuration disclosed herein utilizes the XOR operation described above rather than a hash of the children's hash values. Other variants of a Merckle tree, other types of tree data structures, and other types of non-tree data structures such as a flat list might also be utilized in other configurations.

As will be described in greater detail below, a comparison may be made between the source system tree 112A and the destination system tree 112B in order to determine the level of consistency, or inconsistency, between the data 104A stored at the source computing system 102A and the data 104B stored at the destination computing system 102B. As will also be described below, the utilization of a variant of a Merckle tree permits an optimized comparison of the source system tree 112A and the destination system tree 112B. In this regard, it should be appreciated that other configurations might utilize tree implementations other than variants of Merckle trees or might utilize data structures other than trees. Additional details regarding the operation of the consistency service 110 are provided below with regard to FIG. 4.

As also shown in FIG. 1, a consistency monitoring service 114 might be configured to operation in conjunction with the consistency service 110. The consistency monitoring service 114 is configured to obtain the source system tree 112A and the destination system tree 112B from the consistency service 110 and to perform a comparison between them in order to determine the level of consistency between the data 104A and the data 104B. As discussed above, when the source system tree 112A and the destination system tree 112B are implemented as variants of Merckle tress, an optimized comparison may be performed. Additionally, other types of metrics and information can be generated based upon the comparison of the source system tree 112A and the destination system tree 112B. Additional details regarding the operation of the consistency monitoring service 114 will be provided below with regard to FIG. 5.

As discussed briefly above, in some configurations, a UI such as a GUI or a CLI are provided through which a user can provide corrections to the data 140A and 104B obtained from the source computing system 102A and the destination computing system 102B, respectively. For example, in one particular configuration, a consistency service UI 116 is provided through which a user can configure various aspects of the operation of the consistency monitoring service 114 and perform other functions.

For instance, the consistency service UI 116 might provide functionality for allowing a user to define consistency level thresholds at which certain actions should be taken. For example, and without limitation, rules might be defined that trigger different types of actions based on the determined level of consistency, or inconsistency, between the data 104A and 104B. As several specific examples, electronic mail or other types of messages might be sent and/or trouble tickets might be generated in a trouble ticket system 122 if the level of consistency between the data 104A and 104B falls below a specified threshold level. Other types of actions might also be performed based upon the level of consistency between the data 104A stored at the source computing system 102A and the data 104B stored at the destination computing system 102B determined by the consistency monitoring service 114.

The consistency service UI 116 might also provide functionality for a user to supply corrections 118 to the data 104A and/or the data 104B. The corrections 118 may then be provided to the consistency service 110 for storage. As shown in FIG. 1, for example, a correction stream 120B is illustrated that stores corrections to the data 104B represented by the destination system tree 112B. Similarly, a correction stream 120A is illustrated that stores corrections to the data 104A represented by the source system tree 112A. As will be described in greater detail below, the consistency monitoring service 110 might utilize correction streams 120A and 120B when determining the level of consistency between the data 104A stored at the source computing system 102A and the data 104A stored at the destination computing system 102B. Additional details regarding the operation of the consistency monitoring service 114 in this regard will be provided below with regard to FIG. 5.

It should be appreciated that the various components shown in FIG. 1 are implemented in a service provider network in some configurations. As known to those skilled in the art, a service provider network provides computing resources and other types of services to its customers on a permanent or an as-needed basis. In such a configuration, the functionality provided by the agents 106, the consistency service 110, the consistency monitoring service 114, the consistency service UI 116, and/or the trouble ticket service 122 might be provided on a continual or an as-needed basis to customers of the service provider network. Additional details regarding an illustrative service provider network in which the technologies disclosed herein might be implemented are provided below with regard to FIGS. 11-13. This description is not, however, intended to be limiting as the components described herein and the functionality they provide might be implemented in many other types of computing environments.

Figure 2:
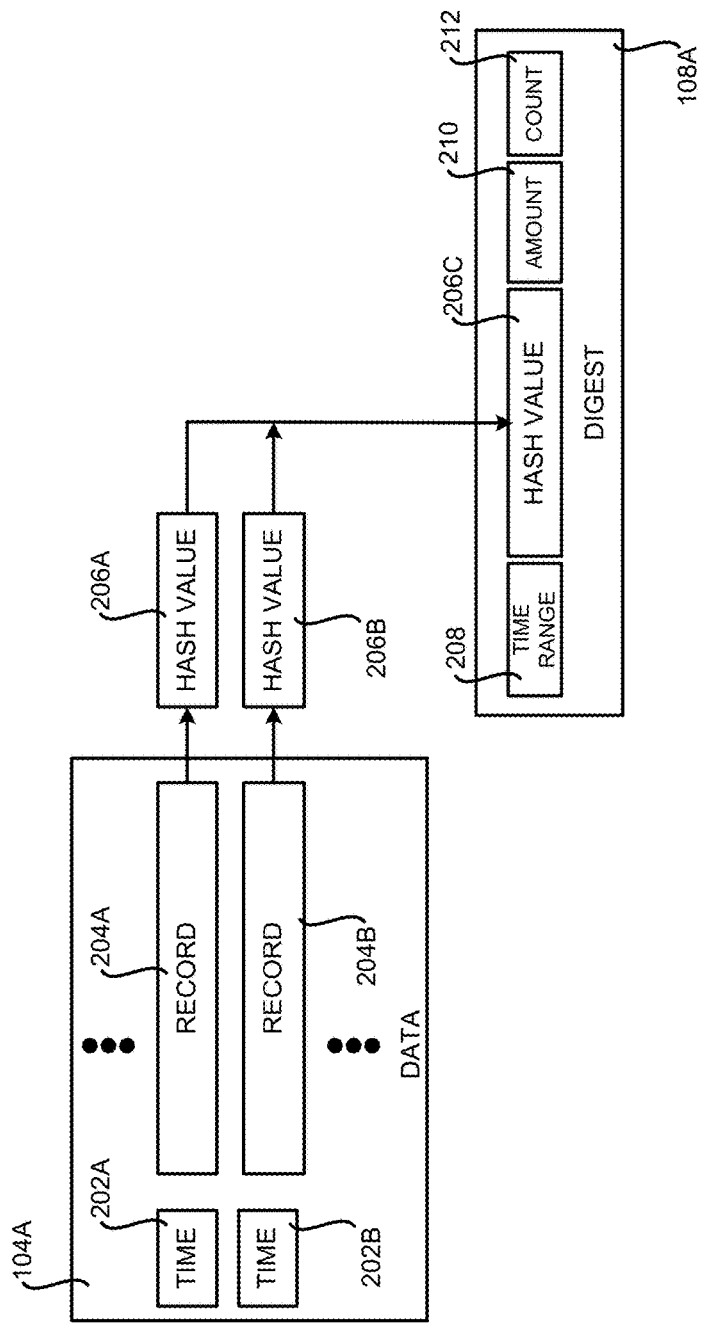
FIG. 2 is a data structure and flow diagram showing aspects of the creation of a digest for use in data reconciliation in one configuration disclosed herein.

FIG. 2 is a data structure and flow diagram showing aspects of the creation of a digest 108 in one particular configuration disclosed herein. As described briefly above, the data 104 collected by the source agent 106A and the destination agent 106B includes a number of records 204 in some configurations. For instance, in the particular example shown in FIG. 2, a portion of the data 104A includes the records 204A and 204B. As also discussed briefly above, the records 204 may include arbitrary attributes. One of the attributes, referred to herein as a selection attribute, may be utilized to select the records 204 for a particular digest 108.

For example, and without limitation, an attribute indicating the time that the records 204 were created on the source system 102A might be utilized as the selection attribute. In the example shown in FIG. 2, for instance, two records 204A and 204B with time values 202A and 202B, respectively, within a certain time period (e.g. one minute) have been selected for inclusion in the digest 108A. Other attributes specifying non-repeating unique values over time might also be utilized as the selection attribute in other configurations.

Once the records 204 have been selected for inclusion in a digest 108, hash values 206 are generated for the records 204 using an appropriate hashing algorithm, such as SHA-256. Other hashing algorithms might also be utilized. In the example shown in FIG. 2, the hash value 206A has been generated for the record 204A and the hash value 206B has been generated for the record 204B.

Once the hash values 206 have been generated, an arithmetic or logical operator may be applied to the hash values 206 to generate a single hash value for inclusion in the digest 108. For example, and without limitation, an XOR operation might be performed on the hash values 206A and 206B in the example shown in FIG. 2, in order to generate a single hash value 206C for inclusion in the digest 108A. Other mathematical or logical operations might also be performed on the hash values 206 of the records 204 that will generate the same result regardless of the order of the input hash values 206. For example, addition or other commutative operations might also be utilized. The selected operation preferably also preserves the pseudo-random properties of the hashing operation.

As shown in FIG. 2, the digest 108A might also specify the range of values for the selection attribute that the digest encompasses. For example, if the selection attribute is a creation time of the records 204, then the digest 108 may identify the range of times that the digest 108 covers. In the example shown in FIG. 2, for instance, a time range 208 is specified that identifies the range of time values 202 for the records 204 represented by the digest 108A.

As also shown in FIG. 2, the digest 108 might also include values for attributes in the records 204 covered by the digest 108. For instance, in the example shown in FIG. 2, the records 204 represent financial transactions having an associated monetary amount. In this case, the attributes of the records 204A and 204B represented by the digest 108A have been summed and are stored as the amount 210. The amount 210 can be utilized as a check on the accuracy of the digest 108A. Other attributes might also be specified in the digest 108A and utilized in a similar manner. For example, a count 212 might be maintained indicating the number of records 204 represented by a digest 108. In the example shown in FIG. 2, for instance, the count 212 might specify that two records (i.e. the records 204A and 204B) are represented by the digest 108A. Additional details regarding this process are provided below.

Figure 3:
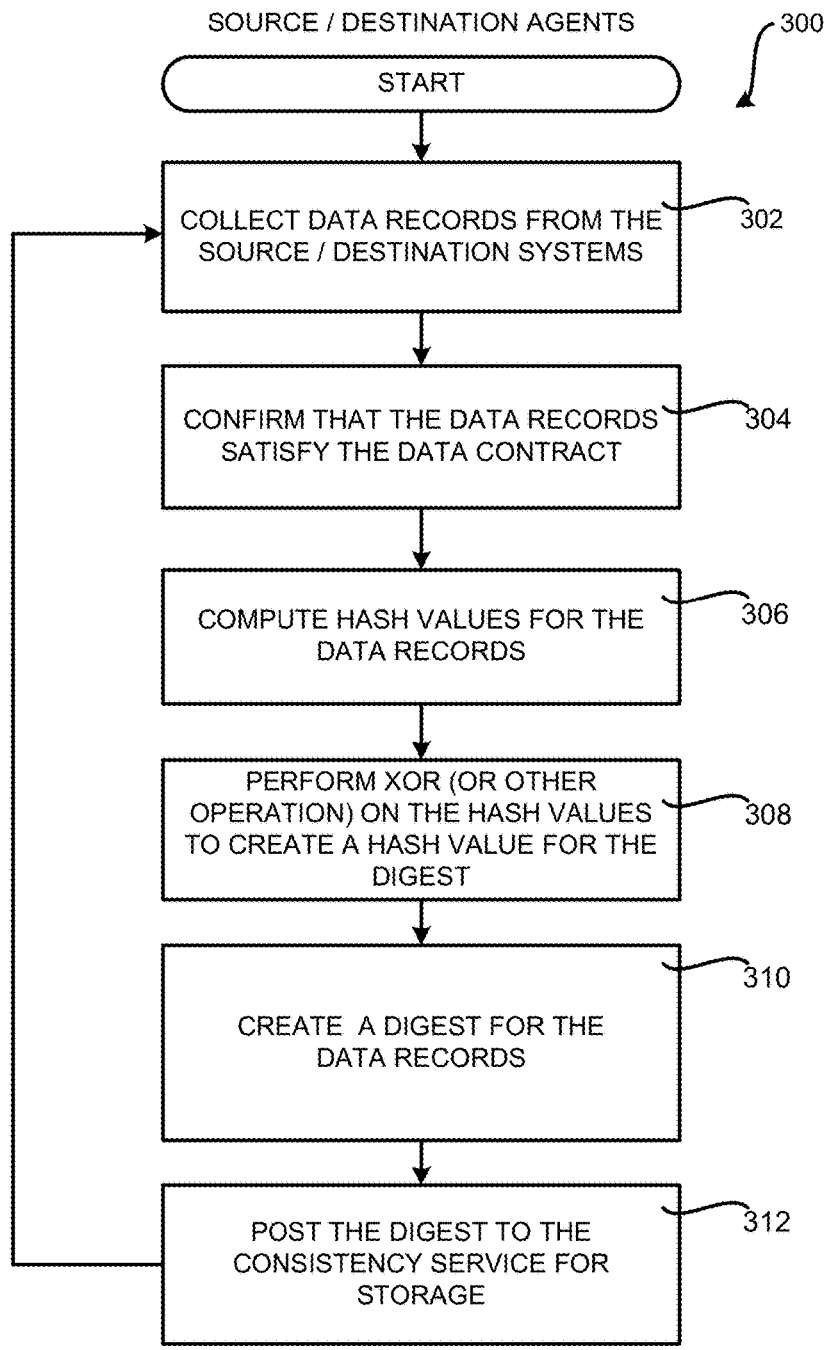
FIG. 3 is a flow diagram illustrating aspects of the operation of a software agent for collecting data records from a source system or a destination system and generating a digest of the records according to one configuration disclosed herein.

FIG. 3 is a flow diagram showing a routine 300 that illustrates aspects of the operation of a software agent, such as the source agent 106A and the destination agent 106B, for collecting data 104A from a source system 102A or collecting data 104B from a destination system 102B, and for generating digests 108 of the records, according to one configuration disclosed herein. It should be appreciated that the logical operations described herein with respect to FIG. 3, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein. Some or all of these operations might also be performed by components other than those specifically identified.

The routine 300 begins at operation 302, where an agent, such as the source agent 106A or the destination agent 106B, collects data records 204 from the source system 102A or the destination system 102B. As discussed above, the records 204 might be collected based upon a selection attribute associated with the records 204. For example, and without limitation, an agent might collect all of the records within one minute, one hour, or one day when the selection attribute is the creation time of the records 204. This process may be repeated so that all of the records 204 created in a particular hour, day, month, year, are processed in a similar fashion and corresponding digests 108 are provided to the consistency service 110. This process might also be performed in a similar fashion when another type of selection attribute is utilized to group the records 204 in the data 104.

From operation 302, the routine 300 proceeds to operation 304, where the agent 106 collecting the data 104 confirms that the received records 204 meet the data contract 107. As discussed briefly above, the data contract 107 might specify that the data 104 stored at both the source computing system 102A and the destination computing system 102B is at the same level of granularity, that the data 104 stored at both systems 102 has a common set of attributes, that there exists a selection attribute that can be utilized to select data records, or that there exists a means to identify the data records from both systems 102A and 102B that have been previously included in the measurement. The data contract 107 might specify other requirements in other configurations. If the records 204 do not meet the data contract 107, then processing may be discontinued. An error message or other type of indicator might also be provided to the administrator of the consistency service 110.

From operation 304, the routine 300 proceeds to operation 306, where the agent 106 computes hash values 206 for the collected records. As discussed above, SHA-256 or another suitable hashing algorithm might be utilized. Once the hash values 206 have been generated, the routine 300 proceeds from operation 306 to operation 308, where the agent 106 performs an arithmetic or logical operation on the hash values 206 order to create the hash value for the digest 108. As discussed above, an XOR operation is performed in one specific configuration, but other types of operations might be utilized in other implementations. The set of aggregable attributes (e.g. the attributes 210 and 212) might also be calculated at operation 308.

Once the hash value has been created at operation 308, the hash value is inserted into the digest 108 at operation 310. Additionally, and as discussed above, other attributes might also be included in the digest 108 at operation 310. Once the digest 108 has been generated, the routine 300 proceeds from operation 310 to operation 312, where the agent 106 provides the digest 108 to the consistency service 110 for storage. Additional details regarding the operation of the consistency service 110 are provided below with regard to FIG. 4. From operation 312, the routine 300 proceeds back to operation 302, where the processing described above might be performed for another group of data records 204.

Figure 4:
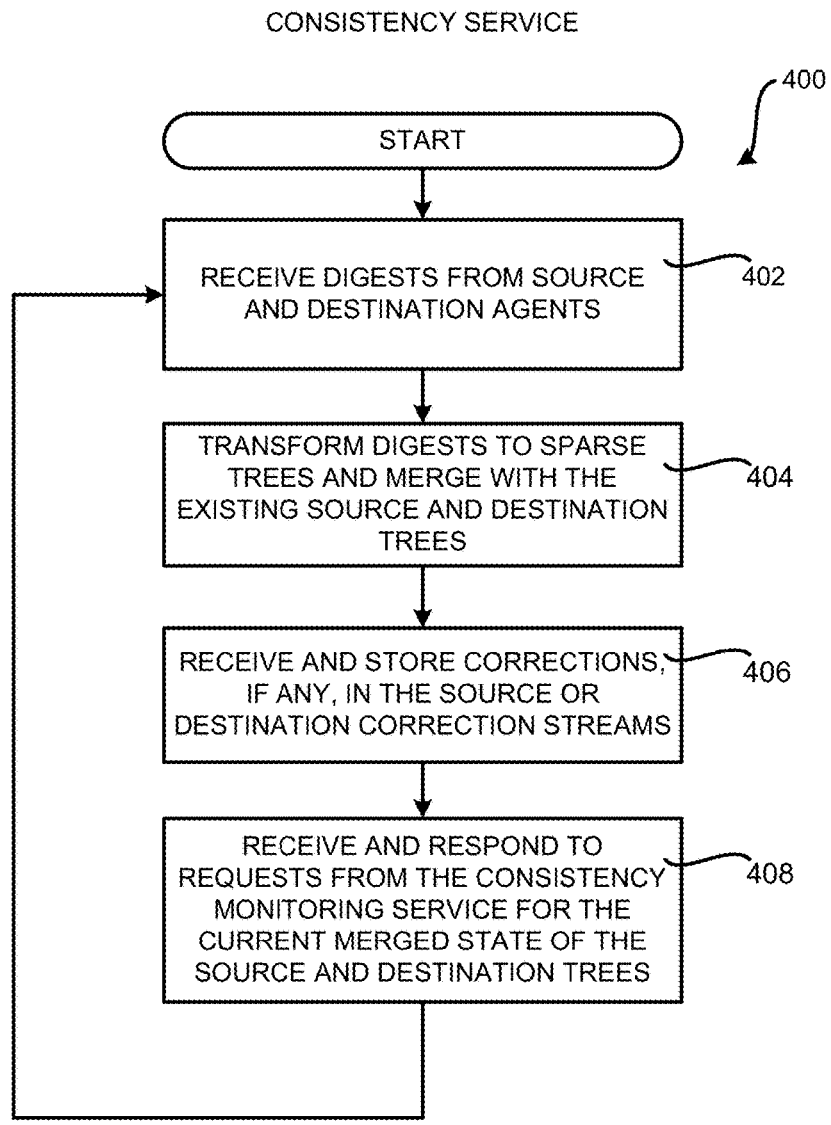
FIG. 4 is a flow diagram illustrating aspects of the operation of a consistency service according to one configuration disclosed herein.

FIG. 4 is a flow diagram showing a routine 400 that illustrates aspects of the operation of the consistency service 110 according to one configuration disclosed herein. The routine 400 begins at operation 402, where the consistency service 110 receives the digests 108 from the source agent 106A and the destination agent 106B. The routine 400 then proceeds from operation 402 to operation 404, where the consistency service 110 transforms the received digests 108 into sparse trees and merges the digests 108 with the existing source system trees. For example, and without limitation, the digests 108A for the source system 102A may be merged with the source system tree 112A. Similarly, the digests 108B for the destination system 102B may be merged with the destination system tree 112B. As discussed above, the source system tree 112A and the destination system tree 112B are implemented as variants of Merckle trees in one particular configuration.

From operation 404, the routine 400 proceeds to operation 406, where the consistency service 110 might also receive and store corrections 118 received from the consistency service UI 116 in one configuration. As discussed above, the corrections 118 describe manual corrections to the data 104A received from the source system 102A or corrections to the data 104B received from the destination system 102B. Corrections 118 to the data 104A may be stored in a correction stream 120A associated with the source system tree 112A and corrections 118 to the data 104B might be stored in a correction stream 120B associated with the destination system tree 112B. As will be described in greater detail below, the correction streams 120A and 120B may be utilized when determining a consistency level of the data 104A and 104B based upon the contents of the source system tree 112A and the destination system tree 112B. Additional details regarding this process are provided below with regard to FIG. 5. In this regard, it should be appreciated that although operation 406 is illustrated in FIG. 4 for convenience, the process for receiving and merging corrections 118 might be performed as a separate, independent process in some configurations.

From operation 406, the routine 400 proceeds to operation 408, where the consistency service 110 might also receive and respond to requests from the consistency monitoring service 114 for the current merged state of the source system tree 112A and the destination system tree 112B. As will be described in greater detail below with regard to FIG. 5, the consistency monitoring service 114 may utilize the source system tree 112A, the source system correction stream 120, the destination system tree 112B, and the destination correction stream 120B to determine the level of consistency between the data 104A and the data 104B. From operation 408, the routine 400 proceeds back to operation 402, where additional digests 108 might be received from the agents 104A and 104B and processed in the manner described above.

Figure 5:
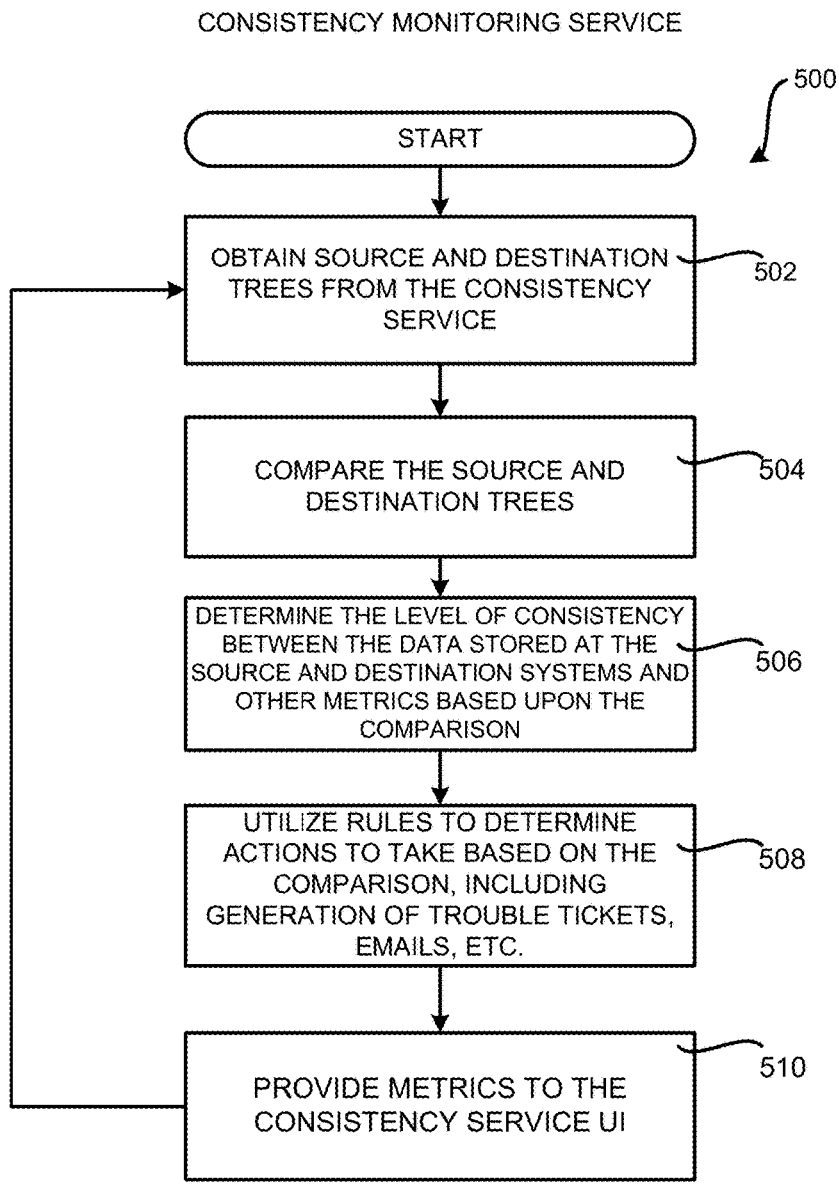
FIG. 5 is a flow diagram illustrating aspects of the operation of a consistency monitoring service according to one configuration disclosed herein.

FIG. 5 is a flow diagram showing a routine 500 that illustrates aspects of the operation of the consistency monitoring service 114 according to one configuration disclosed herein. The routine 500 begins at operation 502, where the consistency monitoring service 114 obtains the current merged source system tree 112A and destination system tree 112B from the consistency service 110. If data exists in the correction streams 120A or 120B, this data might be merged into the trees 112A and 112B before the trees 112A and 112B are provided to the consistency monitoring service 114.

Once the consistency monitoring service 114 has obtained the source system tree 112A and the destination system tree 112B, the routine 500 proceeds from operation 502 to operation 504. At operation 504, the consistency monitoring service 114 performs a comparison between the source system tree 112A and the destination system tree 112B to identify any inconsistencies between the trees 112A and 112B. As discussed above, when the trees 112A and 112B are implemented utilizing a variant of a Merckle tree, an optimized comparison can be performed by first comparing the hash values at the nodes at the top of the trees 112A and 112B. If the hash values match (and any other attributes in the digest 108 match, such as the amount and count attributes in the example give above), then the trees 112A and 112B are completely consistent and no further comparisons do not need to be performed. Non-matching hash values (or other attributes) indicate some inconsistency at a lower portion of the tree. In this case, comparisons are performed between the contents of the digests 108 for nodes in the trees 112A and 112B at the next lower level. In a similar fashion, matching hash values (and other attributes) indicate consistency in the relevant sub-trees, while non-matching values indicate an inconsistency somewhere in the relevant sub-tree. This process can continue until all of the inconsistencies between the trees 112A and 112B have been identified.

Based upon the comparison of the trees 112A and 112B described above, the level of consistency between the data 104A stored at the source system 102A and the data 104B stored at the destination system 104B can be determined at operation 506. Additionally, other types of metrics and data can also be generated such as, but not limited to, a point in time before which the data 104A and 104B are completely consistent and a point in time after which the data 104A and 104B are inconsistent. Other types of metrics might also be generated based upon a comparison of the source system tree 112A and the destination system tree 112B.

From operation 506, the routine 500 proceeds to operation 508, where the consistency monitoring service 114 identifies one or more actions to take based upon user-defined rules that are based on the level of consistency and/or other metrics. For example, and as described above, the consistency monitoring service 114 might generate a trouble ticket in the trouble ticket service 122 and/or take other types of actions based on the rules.

From operation 508, the routine 500 proceeds to operation 510, where the consistency monitoring service 114 might provide the data generated at operation 508 to the consistency service UI 116 for presentation to a user. For example, and without limitation, the consistency monitoring service 114 might provide the determined level of consistency between the data 104A and 104B and/or any other metrics generated at operation 508 to the consistency service UI 116. As will be described in greater detail below with regard to FIG. 6, the consistency service UI 116 might present this and other data to a user in an appropriate UI. Other types of UIs might also be utilized to present the results of the analysis performed by the consistency monitoring service 114. From operation 510, the routine 500 proceeds back to operation 502, where the operations described above may be repeated.

Figure 6:
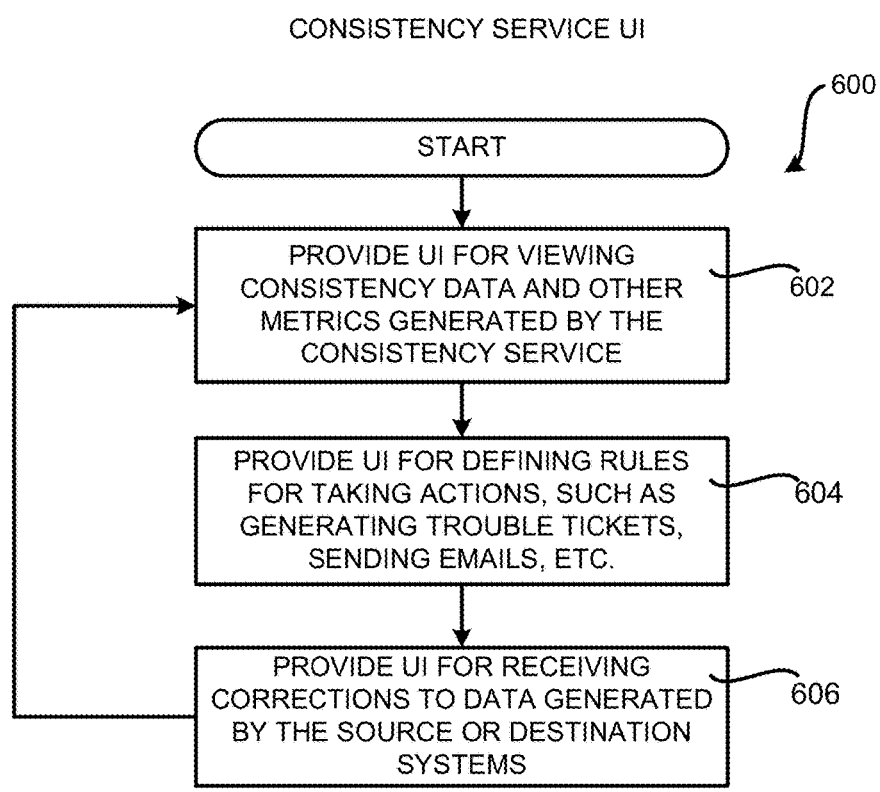
FIG. 6 is a flow diagram illustrating aspects of the operation of a consistency service user interface ("UI") according to one configuration disclosed herein.

FIG. 6 is a flow diagram showing a routine 600 that illustrates aspects of the operation of the consistency service UI 116 according to one configuration disclosed herein. As discussed briefly above, the consistency service UI 116 provides functionality for presenting the data generated by the consistency monitoring service 114 at operation 508 to users in an appropriate UI. The consistency service UI 116 might also provide a UI for allowing a user to define rules utilized by the consistency monitoring service 114 to determine when messages or other types of alerts or trouble tickets are to be generated in response to the computed level of consistency falling below a specific threshold. The consistency service UI 116 might also provide a UI for configuring other aspects of the operation of the consistency monitoring service 114. Details regarding the operation of the consistency service UI 116 are provided below.

The routine 600 begins at operation 602, where the consistency service UI 116 provides a UI for viewing the consistency data and other metrics generated by the consistency service at operation 508, described above. The routine 600 then proceeds from operation 602 to operation 604, where the consistency service UI 116 might provide a UI for defining rules utilized by the consistency monitoring service 114 to determine when certain types of actions are to be taken. For example, the consistency service UI 116 might allow a user to specify a threshold level of consistency between the data 104A and the data 104B. When the level of consistency falls below the threshold (i.e. the level of inconsistency is above the threshold), the consistency monitoring service 114 might create a trouble ticket in the trouble ticket system 122, cause an electronic mail message or other type of message to be sent to an administrator, or to take another type of action.

As another example, the consistency service UI 116 might allow a user to specify a rule to create a trouble ticket or take another action when the age of inconsistency is higher than a configured threshold. Similarly, a rule might be defined to generate a trouble ticket or take another action when data 104A has not been submitted to the destination system 102B for longer than a configured threshold or when digests 108 have not been submitted to the consistency service 110. The consistency monitoring service 114 might continually monitor the defined rules in order to determine the type of action that is to be taken.

From operation 604, the routine 600 proceeds to operation 606, where the consistency service UI 116 might also provide a UI for receiving corrections 118 to the data 104A maintained by the source system 102A and/or the data 104B maintained by the destination system 102B. As discussed above, the consistency service UI 116 may provide the corrections 118 to the consistency service 110 for merging with the source system tree 112A or the destination system tree 112B. The corrections 118 might also be provided to the consistency service 110 in other ways in other configurations.

It should be appreciated that other types of UIs might be provided alternatively or in addition to the UI described above. For example, and without limitation, a command line interface, a voice, or a gesture-based UI might be provided to perform the various functions described above. The UI might also provide functionality for viewing the actual data 104A and 104B underlying the source system tree 112A and the destination system tree 112B, respectively. The UI might also show a histogram illustrating time periods in which the data 104B is consistent or inconsistent. Other types of UIs might be provided in other configurations. From operation 606, the routine 600 proceeds back to operation 602, where the operations described above may be repeated.

FIGS. 7-10 are data flow diagrams showing an example data reconciliation that illustrates aspects of the operation of the various technologies disclosed herein. In the example shown in FIGS. 7-10, data records are being sent from "System A" (i.e. the source system 102A) to "System B"

(i.e. the destination system 102B). As discussed above, the transferred data records contain an arbitrary set of attributes. In the specific example shown in FIGS. 7-10, the attributes include a monetary amount, an identifier ("ID"), and a time stamp. When the data is stored by System B, another time stamp may be added for tracking purposes.

As also discussed above, the data records sent from System A to System B may arrive out of order, be delayed, never arrive, or be corrupted while in transit or when stored. The same set of conditions apply to the digests 108 sent to the consistency service 110. For the purposes of the example shown in FIGS. 7-10, it will be assumed that the agent 106A (shown as "Agent A" in FIGS. 7-10) and the agent 106B (shown as "Agent B" in FIGS. 7-10) are including one minute of data in each digest 108, resulting in four updates in this particular example: source agent 01:00 to 01:01 and 01:01 to 01:02 and destination agent 02:00 to 02:01 and 02:01 to 02:02. Delivery to the consistency service 110 in the following order will also be assumed: source agent 01:00 to 01:01; destination agent 02:00 to 02:01; source agent 01:01 to 01:02; and destination agent 02:01 to 02:02.

In the example shown in FIGS. 7-10, the source agent 106A and the destination agent 106B are selecting data from their corresponding systems, and are providing digests 108 of that data to the consistency service 110. The selection attribute for the data in this example is the timestamp assigned to the records by the source system 102A, and the digests 108 are, therefore, grouped by the source system 102A time stamp. For this example, intervals of one minute worth of data are grouped together in a single digest 108.

To produce the digests 108, the selected records 204 are hashed using SHA-256 or another suitable hashing algorithm, and the hash values 204 are combined by applying an XOR operation to the hash values in the manner described above. The monetary amounts and record counts for the records in this specific example are combined using addition. In the diagrams, only the first 32 bits of the hash values 206 are displayed for ease of presentation.

When a digest 108 is received from an agent 106, the consistency service 110 first converts the digest 108 into a sparse tree. The consistency service 110 then merges the digest 108 into the tree for the appropriate system. For example, a digest 108A received for the source system 102A is merged into the source system tree 112A and a digest for the destination system 102B is merged into the destination system tree 112B. Each level of the trees 112A and 112B represents a different key interval size, with child nodes "rolling up" into the parent. As discussed above, once constructed, the source system tree 112A and the destination system tree 112B can be compared to determine the level of consistency between the data 104A of the source system 102A and the data 104B of the destination system 102B.

Figure 7:
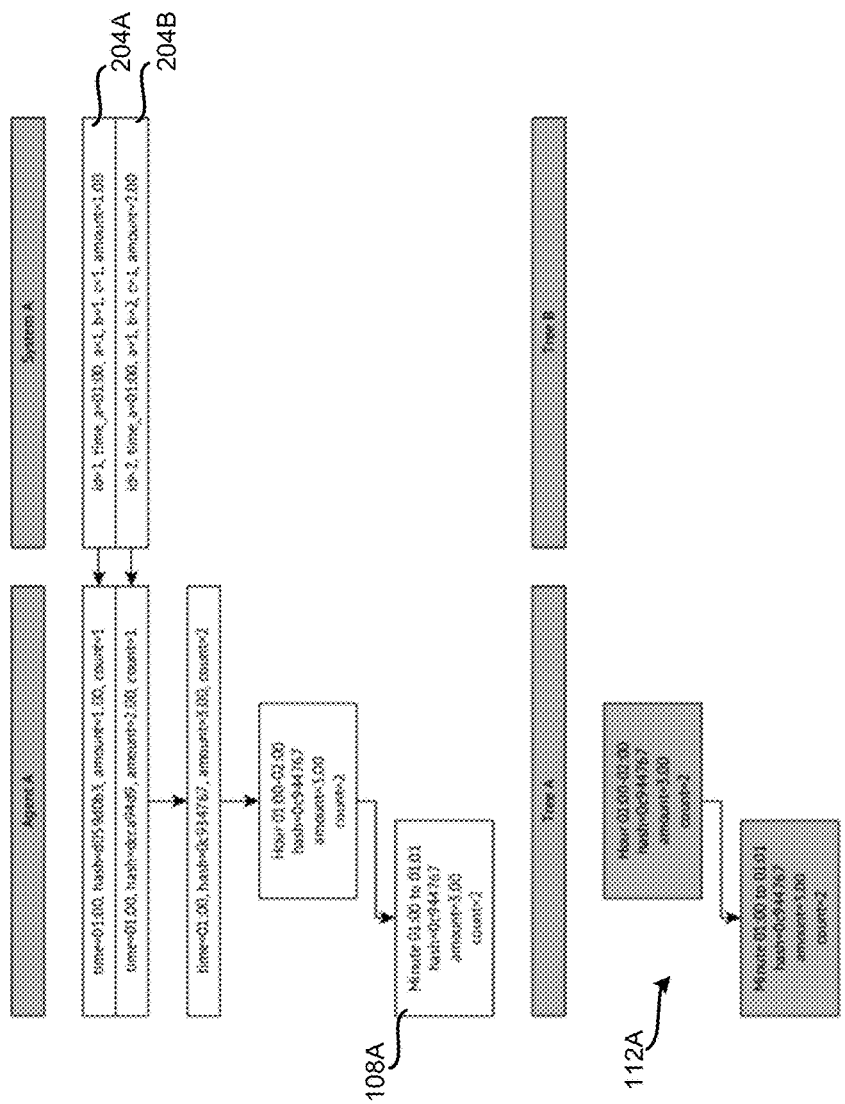
FIGS. 7-10 are data flow diagrams showing an example data reconciliation that illustrates aspects of the operation of the various technologies disclosed herein.
Figure 8:
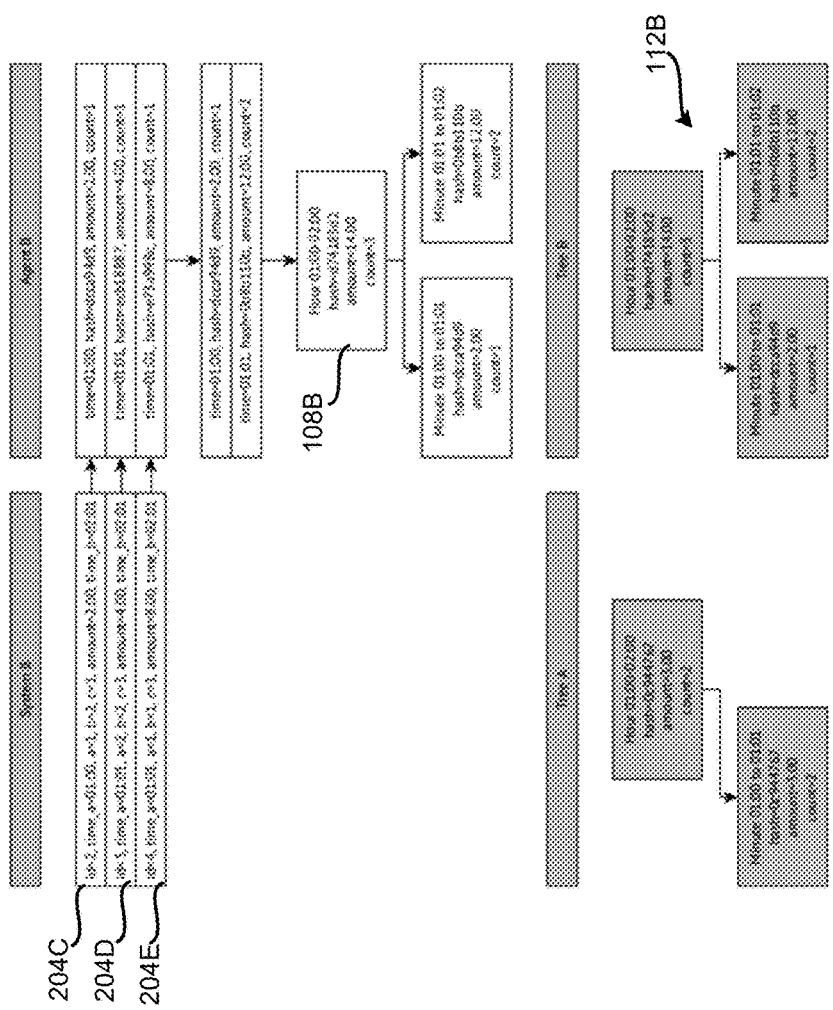

FIG. 7 shows the first digest 108A for the records 204A and 204B from the source agent 106A being merged into the source system tree 112A. When compared to the empty destination tree 112B, all nodes in the trees 112A and 112B are unmatched, thereby indicating that the data 104A and 104B is completely inconsistent. In FIG. 8, the destination agent 106B selects the records 204C-204E from the destination system 102B using the destination system 102B time stamp, and produces a digest 108B that is grouped by the source system 102A time stamp. It then sends the digest 108B to the consistency service 110, where it is merged into the current destination system tree 112B. The result is that the source system tree 112A and the destination system tree 112B still do not match.

Figure 9:
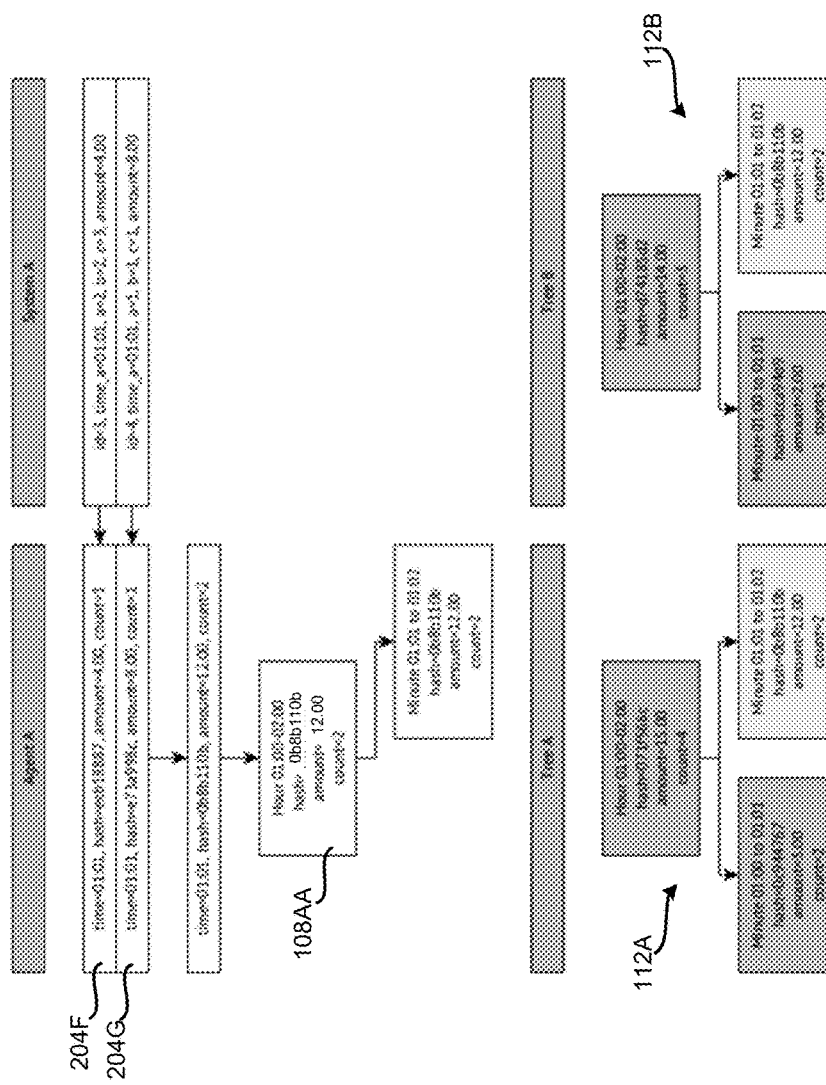
Figure 10:
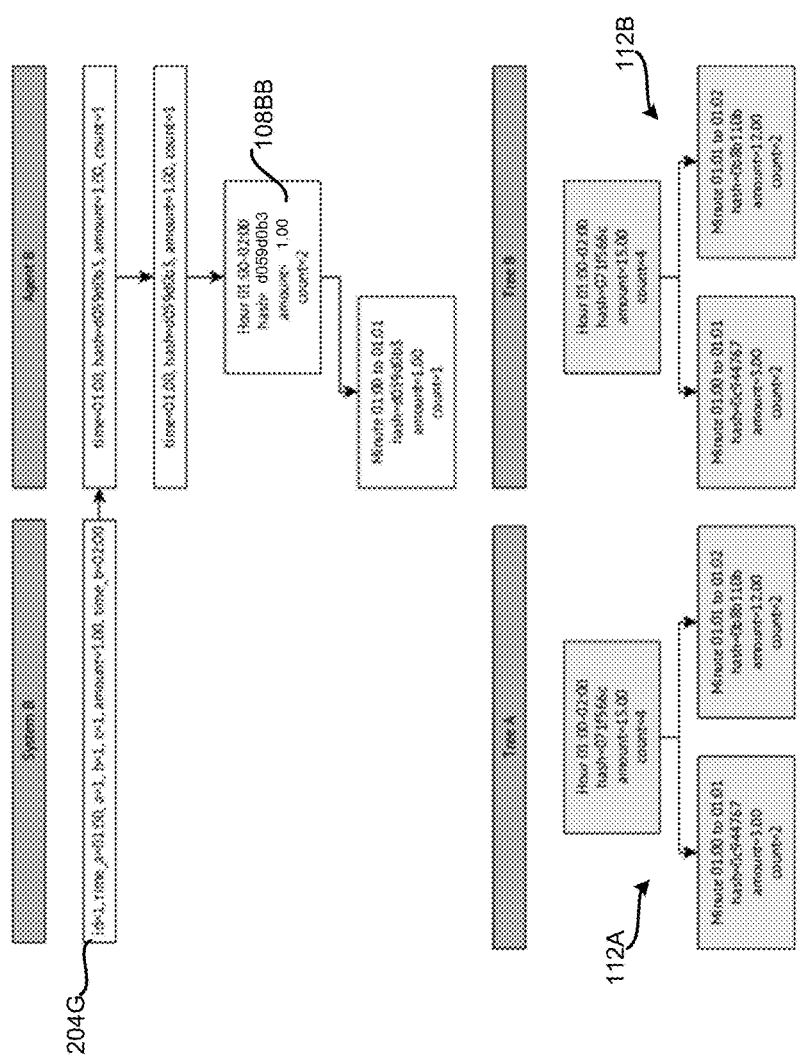

In FIG. 9, the source agent 106A is sending the next digest 108AA for the records 204F and 204G. The result is that the source system tree 112A and the destination system tree 112B now partially match. In FIG. 10, the destination agent 106B has sent the digest 108BB to the consistency service 110 for the record 204G. Once the digest 108BB is merged into the current destination system tree 112B, the source system tree 112A and the destination system tree will fully match.

It should be appreciated that the example shown in FIGS. 7-10 has been simplified for discussion purposes and, consequently, these examples are not meant to be limiting to the present disclosure in any way. Digests 118 containing many more records 204 than illustrated herein might be transferred and processed in a similar fashion.

Figure 11:
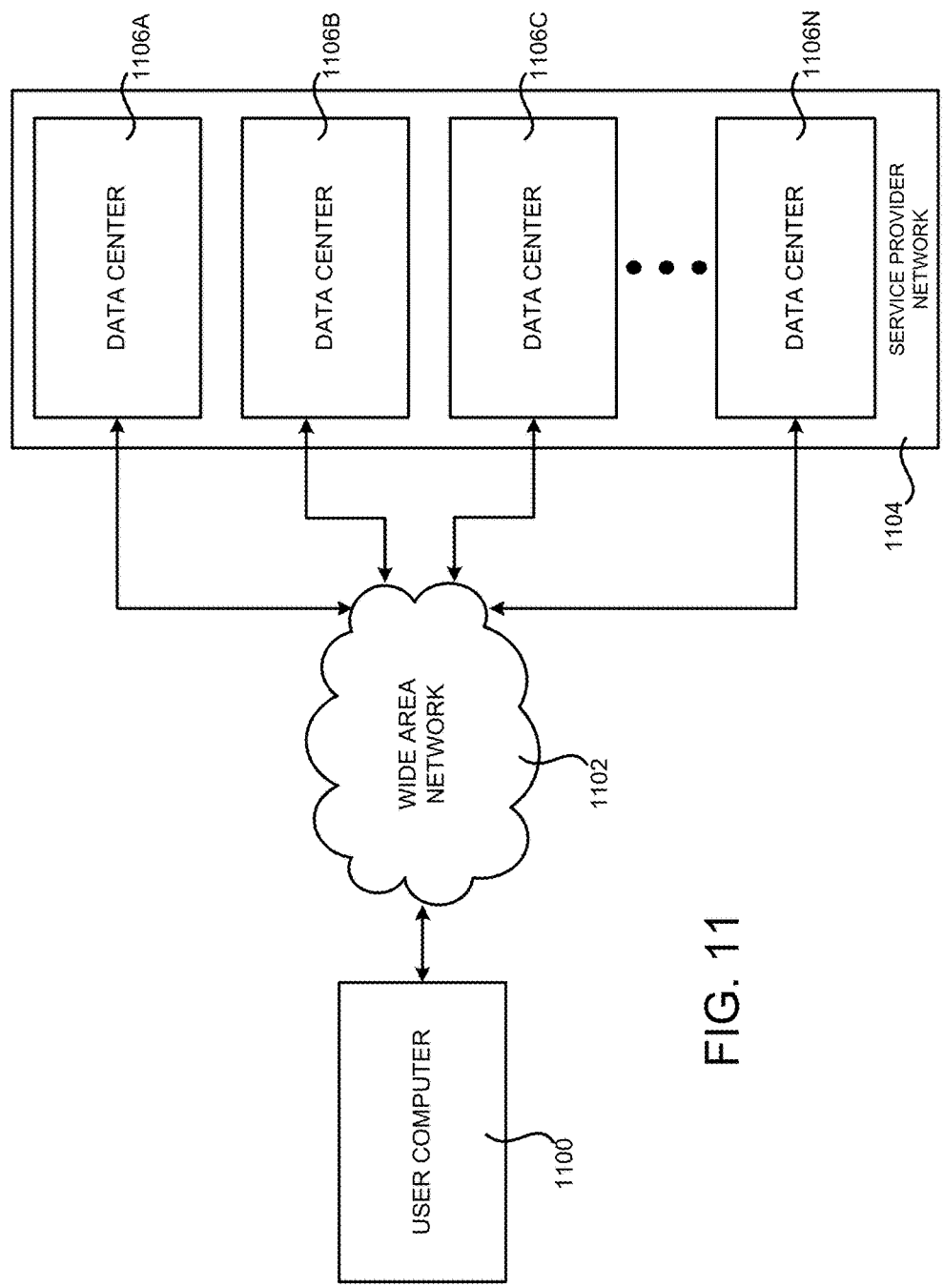
FIG. 11 is a system and network diagram that shows aspects of one illustrative operating environment for the technologies disclosed herein that includes a service provider network that may be utilized to execute the software components described herein.

FIG. 11 and the following description are intended to provide a brief, general description of a suitable computing environment in which the technologies described herein may be implemented. In particular, FIG. 11 is a system and network diagram that shows an illustrative operating environment that includes a service provider network 1104. As discussed briefly above, a service provider network 1104 such as that shown in FIG. 11 and described in further detail below may be utilized to implement the functionality disclosed herein. By implementing the disclosed functionality in a service provider network such as that illustrated in FIGS. 11 and 12, the technologies described above may be implemented in a way that is scalable, reliable, and secure.

The computing resources provided by the service provider network 1104 may include various types of resources, such as data processing resources, data storage resources, networking resources, data communication resources, and the like. Each type of computing resource may be general-purpose or may be available in a number of specific configurations. For example, data processing resources may be available as virtual machine instances in a number of different configurations.

The virtual machine instances may be configured to execute applications, including Web servers, application servers, media servers, database servers, and other types of applications. The virtual machine instances might also be configured to execute the consistency service 110, the consistency monitoring service 114, the consistency service UI 116, the trouble ticket service 122, the source system 102A, and the destination system 102B and/or any of the other software components described herein. Data storage resources may include file storage devices, block storage devices, and the like. Each type or configuration of a computing resource may be available in different sizes, such as large resources, consisting of many processors, large amounts of memory, and/or large storage capacity, and small resources consisting of fewer processors, smaller amounts of memory, and/or smaller storage capacity.

As also mentioned above, the computing resources provided by the service provider network 1104 are enabled in one implementation by one or more data centers 1106A-1106N (which may be referred to herein singularly as "a data center 1106" or collectively as "the data centers 1106"). The data centers 1106 are facilities utilized to house and operate computer systems and associated components. The data centers 1106 typically include redundant and backup power, communications, cooling, and security systems. The data centers 1106 might also be located in geographically disparate locations. One illustrative configuration for a data center 1106 that may be utilized to implement the concepts and technologies disclosed herein will be described below with regard to FIG. 12.

Users of the service provider network 1104 may access the computing resources provided by the data centers 1106 over a suitable data communications network, such as a Wide Area Network ("WAN") 1102. For example, and as shown in FIG. 11, a user might utilize an appropriate user computer 1100 to access and utilize the services described herein. Although a WAN 1102 is illustrated in FIG. 11, it should be appreciated that a local-area network ("LAN"), the Internet, or any other networking topology known in the art that connects the data centers 1106 with other networks and/or computing devices, such as the user computer 1100, may be utilized. It should also be appreciated that combinations of such networks might also be utilized.

Figure 12:
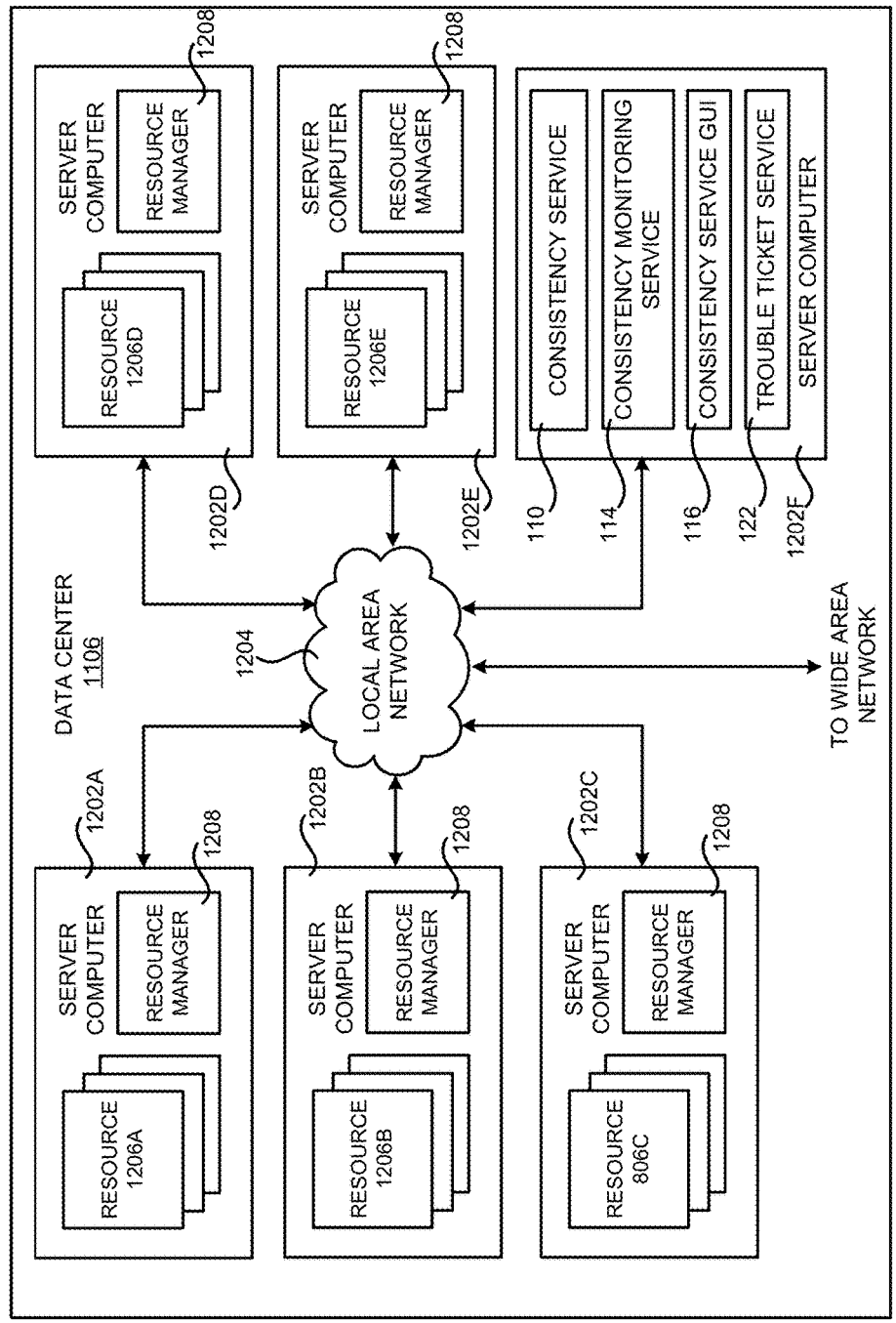
FIG. 12 is a computing system diagram that illustrates one configuration for a data center that may be utilized to implement aspects of the technologies disclosed herein.

FIG. 12 is a computing system diagram that illustrates one configuration for a data center 1106 that implements aspects of the concepts and technologies disclosed herein for data reconciliation. The example data center 1106 shown in FIG. 12 includes several server computers 1202A-1202F (which may be referred to herein singularly as "a server computer 1202" or in the plural as "the server computers 1202") for providing computing resources 1206A-1206E.

The server computers 1202 may be standard tower, rackmount, or blade server computers configured appropriately for providing the computing resources described herein. As mentioned above, the computing resources might be data processing resources such as virtual machine instances or hardware computing systems, data storage resources, database resources, networking resources, and others. Some of the servers 1202 might also be configured to execute a resource manager 1208 capable of instantiating and/or managing the computing resources. In the case of virtual machine instances, for example, the resource manager 1208 might be a hypervisor or another type of program configured to enable the execution of multiple virtual machine instances on a single server 1202. Server computers 1202 in the data center 1106 might also be configured to provide network services and other types of services.

The data center 1106 shown in FIG. 12 also includes one or more server computers 1202, such as the server computer 1202F, that may execute some or all of the software components described above. For example, and without limitation, the server computer 1202F might be configured to execute the consistency service 110, the consistency monitoring service 114, the consistency service UI 116, the trouble ticket service 122, the source system 102A, and the destination system 102B. The server computer 1202F might also be configured to execute other components and/or to store data for providing some or all of the functionality described herein. In this regard, it should be appreciated that the services illustrated in FIG. 12 as executing on the server computer 1202F might execute on many other physical or virtual servers in the data centers 1106 in various configurations.

In the example data center 1106 shown in FIG. 12, an appropriate LAN 1204 is also utilized to interconnect the server computers 1202A-1202F. The LAN 1204 is also connected to the network 1102 illustrated in FIG. 11. It should be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components might also be utilized for balancing a load between each of the data centers 1106A-1106N, between each of the server computers 1202A-1202F in each data center 1106, and, potentially, between computing resources in each of the data centers 1106. It should be appreciated that the configuration of the data center 1106 described with reference to FIG. 12 is merely illustrative and that other implementations might be utilized.

Figure 13:
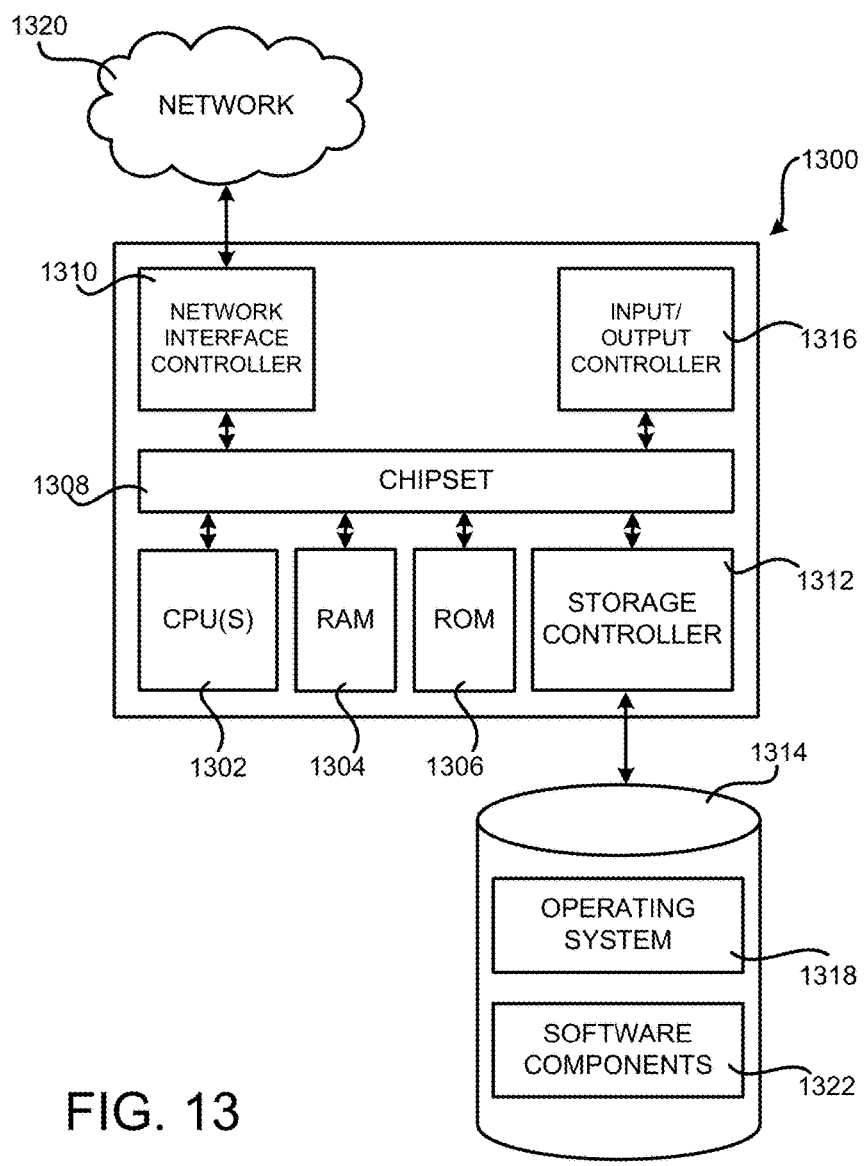
FIG. 13 is a computer architecture diagram showing an illustrative computer hardware architecture for implementing computing devices described herein.

FIG. 13 shows an example computer architecture for a computer 1300 capable of executing the software components described herein. The computer architecture shown in FIG. 13 illustrates a conventional server computer, workstation, desktop computer, laptop, network appliance, tablet computing device, electronic book reader, smart telephone, or other computing device, and may be utilized to execute any aspects of the software components presented herein and discussed above with regard to FIGS. 1-12.

The computer 1300 includes a baseboard, or "motherboard," which is a printed circuit board to which a multitude of components or devices may be connected by way of a system bus or other electrical communication paths. In one illustrative configuration, one or more central processing units ("CPUs") 1302 operate in conjunction with a chipset 1308. The CPUs 1302 are standard programmable processors that perform arithmetic and logical operations necessary for the operation of the computer 1300.

The CPUs 1302 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1308 provides an interface between the CPUs 1302 and other components and devices on the baseboard. For instance, the chipset 1308 may provide an interface to a random access memory ("RAM") 1304, used as the main memory in the computer 1300. The chipset 1308 may further provide an interface to a computer-readable storage medium such as a read-only memory ("ROM") 1306 or non-volatile RAM ("NVRAM") for storing basic routines that help to startup the computer 1300 and to transfer information between the various components and devices. The ROM 1306 or NVRAM may also store other software components necessary for the operation of the computer 1300 in accordance with the various configurations described herein.

The computer 1300 may also operate in a networked environment using logical connections to remote computing devices and computer systems through the network 1320, such as a LAN, a WAN, the Internet, or any other networking topology known in the art that connects the computer 1300 to remote computers. The chipset 1308 includes functionality for providing network connectivity through a network interface controller ("NIC") 1310, such as a gigabit Ethernet adapter. The NIC 1310 is capable of connecting the computer 1300 to other computing devices over the network 1320. It should be appreciated that any number of NICs 1310 may be present in the computer 1300, connecting the computer 1300 to various types of networks and remote computer systems.

The computer 1300 may be connected to a mass storage device 1314 that provides non-volatile storage for the computer 1300. The mass storage device 1314 may store system programs, application programs, other program modules, and data, which are described in greater detail herein. The mass storage device 1314 may be connected to the computer 1300 through a storage controller 1312 connected to the chipset 1308. The mass storage device 1314 may consist of one or more physical storage units. The storage controller 1312 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 1300 may store data on the mass storage device 1314 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1314 is characterized as primary or secondary storage, and the like.

For example, the computer 1300 may store information to the mass storage device 1314 by issuing instructions through the storage controller 1312 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1300 may further read information from the mass storage device 1314 by detecting the physical states or characteristics of one or more particular locations within the physical storage units.

In addition to the mass storage device 1314 described above, the computer 1300 may have access to other computer-readable storage media to store and retrieve information, such as program modules, data structures, or other data. It should be appreciated by those skilled in the art that computer-readable storage media can be any available non-transitory media that may be accessed by the computer 1300. By way of example, and not limitation, computer-readable storage media may include volatile and non-volatile, removable and non-removable media implemented in any method or technology. Computer-readable storage media includes RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1314 may store an operating system 1318 utilized to control the operation of the computer 1300. In one configuration the operating system 1318 comprises the LINUX operating system. According to another configuration, the operating system 1318 comprises one of the family of WINDOWS operating systems from MICROSOFT Corporation of Redmond, Wash. According to other configurations, the operating system 1318 comprises the UNIX operating system, the LINUX operating system, or a variant thereof. It should be appreciated that other operating systems may also be utilized. The mass storage device 1314 may store other software components 1322 and data utilized by the computer 1300, such as those described above, to provide the functionality described herein.

In one configuration, the mass storage device 1314 or other computer-readable storage media are encoded with computer-executable instructions that, when loaded into the computer 1300, may transform the computer from a general-purpose computing system into a special-purpose computer capable of implementing the technologies described herein. These computer-executable instructions transform the computer 1300 by specifying how the CPUs 1302 transition between states, as described above. According to one configuration, the computer 1300 has access to computer-readable storage media storing computer-executable instructions which, when executed by the computer 1300 (i.e. the CPUs 1302), perform some or all of the operations described above with respect to FIGS. 1-6.

The computer 1300 might also include one or more input/output controllers 1316 for receiving and processing input from a number of input devices, such as a keyboard, a mouse, a touchpad, a touch screen, an electronic stylus, or other type of input device (not shown in FIG. 13). Similarly, an input/output controller 1316 may provide output to a display, such as a computer monitor, a flat-panel display, a digital projector, a printer, a plotter, or other type of output device (also not shown in FIG. 13). It will be appreciated that the computer 1300 may not include all of the components shown in FIG. 13, may include other components that are not explicitly shown in FIG. 13, or may utilize an architecture completely different than that shown in FIG. 13.

Based on the foregoing, it should be appreciated that various concepts and technologies for data reconciliation have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A computer-implemented method for data reconciliation, comprising:
    obtaining data stored at a first system by way of a first agent, the first system being configured to transfer the data to a second system;
    obtaining the data stored at the second system by way of a second agent, the second system being configured to receive the data from the first system;
    generating, by way of the first agent, one or more first digests of at least a first portion of the data obtained from the first system, wherein the one or more first digests are organized according to a first tree, wherein the first tree includes a first variant of a Merckle tree;
    generating, by way of the second agent, one or second more digests of at least a second portion of the data obtained from the second system, wherein the one or more second digests are organized according to a second tree, wherein the second tree includes a second variant of the Merckle tree;

storing the one or more first digests of the at least the first portion of the data obtained from the first system in the first tree;

storing the one or more second digests of the at least the second portion of the data obtained from the second system in the second tree;

performing, during a first period of time, a first comparison between a first portion of the first tree and a second portion of the second tree to determine a first level of consistency between the data stored at the first system and the data stored at the second system;

performing, during a second period of time that at least partially overlaps with the first period of time, a second comparison between a third portion of the first tree and a fourth portion of the second tree to determine a second level of consistency between the data stored at the first system and the data stored at the second system; and determining one or more actions to be performed based at least in part on at least one of the first level of consistency or the second level of consistency.

2. The computer-implemented method of claim 1, wherein the one or more first digests of the at least the first portion of the data obtained from the first system comprise a hash value generated by performing an exclusive OR (XOR) operation on hash values of records in the data obtained from the first system.

3. The computer-implemented method of claim 1, wherein the one or more second digests of the at least the second portion of the data obtained from the second system comprise a hash value generated by performing an exclusive OR (XOR) operation on hash values of records in the data obtained from the second system.

4. The computer-implemented method of claim 1, further comprising receiving first corrections to the data obtained from the first system or second corrections to the data obtained from the second system, and wherein the first corrections to the data obtained from the first system and the second corrections to the data obtained from the second system are utilized during at least one of performing the first comparison between the first portion of the first tree and the second portion of the second tree or performing the second comparison between the third portion of the first tree and the fourth portion of the second tree.

5. The computer-implemented method of claim 1, further comprising determining that the data obtained from the first system and the data obtained from the second system satisfy a data contract.

6. The computer-implemented method of claim 1, further comprising utilizing one or more rules to determine the one or more actions to be performed based at least in part on at least one of the first level of consistency or the second level of consistency.

7. A non-transitory computer-readable storage medium having computer-executable instructions stored thereupon which, when executed by a computer, cause the computer to:

obtain one or more first digests of data stored at a first computing system;

obtain one or more second digests of data stored at a second computing system, the data stored at the second computing system being received from the first computing system;

organize the one or more first digests of the data stored at the first computing system into a first tree, wherein the first tree includes a first variant of a Merckle tree;

organize the one or more second digests of the data stored at the second computing system into a second tree, wherein the second tree includes a second variant of the Merckle tree;

perform, during a first period of time, a first comparison between a first portion of the first tree and a second portion of the second tree to determine a first level of consistency between the data stored at the first computing system and the data stored at the second computing system; and perform, during a second period of time that at least partially overlaps with the first period of time, a second comparison between a third portion of the first tree and a fourth portion of the second tree to determine a second level of consistency between the data stored at the first computing system and the data stored at the second computing system.

8. The non-transitory computer-readable storage medium of claim 7, wherein the one or more first digests of the data stored at the first computing system comprise hash values generated by performing an exclusive OR (XOR) operation on hash values of records in the data stored at the first computing system.

9. The non-transitory computer-readable storage medium of claim 7, wherein the one or more second digests of the data stored at the second computing system comprise hash values generated by performing an exclusive OR (XOR) operation on hash values of records in the data stored at the second computing system.

10. The non-transitory computer-readable storage medium of claim 7, having further computer-executable instructions stored thereupon to verify that the data stored at the first computing system and the data stored at the second computing system satisfy a data contract.

11. The non-transitory computer-readable storage medium of claim 7, having further computer-executable instructions stored thereupon to utilize one or more rules to determine one or more actions to be performed based at least in part on at least one of the first level of consistency or the second level of consistency.

12. The non-transitory computer-readable storage medium of claim 7, having further computer-executable instructions stored thereupon to receive one or more first corrections to the data received from the first computing system or one or more second corrections to the data received from the second computing system and to utilize the one or more first corrections and the one or more second corrections during at least one of determining the first level of consistency and the second level of consistency between the data stored at the first computing system and the data stored at the second computing system.

13. A system for data reconciliation, comprising:

a processor; and a non-transitory computer-readable storage medium having computer-executable instructions stored thereupon which, when executed by the processor, cause the processor to:

obtain one or more first digests of data stored at a source computing system;

obtain one or more second digests of data stored at a destination computing system, the data stored at the destination computing system being received from the source computing system;

store the one or more first digests of the data stored at the source computing system in a first data structure, wherein the first data structure includes a first variant of a Merckle tree;

store the one or more second digests of the data stored at the destination computing system in a second data structure, wherein the second data structure includes a second variant of the Merckle tree;

perform, during a first period of time, a first comparison between a first portion of the first data structure and a second portion of the second data structure to determine a first level of consistency between the data stored at the source computing system and the data stored at the destination computing system; and perform, during a second period of time that at least partially overlaps with the first period of time, a second comparison between a third portion of the first data structure and a fourth portion of the second data structure to determine a second level of consistency between the data stored at the source computing system and the data stored at the destination computing system.

14. The non-transitory computer-readable storage medium of claim 11, wherein the one or more actions include at least one of generating a trouble ticket or causing a notification to be sent.

15. The system of claim 13, wherein the one or more first digests of data stored at the source computing system comprise a first hash value computed from a first hash value record in the data stored at the source computing system, and wherein the one or more second digests of data stored at the destination computing system comprise a second hash value computed from second hash value record in the data stored at the destination computing system.

16. The system of claim 13, wherein the non-transitory computer-readable storage medium has further computer-executable instructions stored thereupon to provide an interface for specifying first corrections to the data stored at the source computing system and second corrections to the data stored at the destination computing system.

17. The system of claim 16, wherein the non-transitory computer-readable storage medium has further computer-executable instructions stored thereupon to utilize the first corrections to the data stored at the source computing system and the second corrections to the data stored at the destination computing system when computing at least one of the first level of consistency or the second level of consistency between the data stored at the source computing system and the data stored at the destination computing system.

18. The system of claim 13, wherein the non-transitory computer-readable storage medium has further computer-executable instructions stored thereupon to utilize one or more rules to determine one or more actions to be performed based at least in part on at least one of the first level of consistency or the second level of consistency.

19. The system of claim 18, wherein the one or more actions include at least one of generating a trouble ticket or causing a notification to be sent.

20. The system of claim 13, wherein the non-transitory computer-readable storage medium has further computer-executable instructions stored thereupon to verify that the data stored at the source computing system and the data stored at the destination computing system satisfy a data contract.

* * * * *